United States Patent
Momchilov et al.

(10) Patent No.: US 10,924,554 B2
(45) Date of Patent: Feb. 16, 2021

(54) APPLICATION CUSTOMIZATION

(71) Applicant: Citrix Systems, Inc., Fort Lauderdale, FL (US)

(72) Inventors: Georgy Momchilov, Parkland, FL (US); Gary Barton, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 361 days.

(21) Appl. No.: 14/490,198

(22) Filed: Sep. 18, 2014

(65) Prior Publication Data

US 2015/0319252 A1    Nov. 5, 2015

Related U.S. Application Data

(60) Provisional application No. 61/988,437, filed on May 5, 2014.

(51) Int. Cl.
*H04L 29/08* (2006.01)
*H04L 29/06* (2006.01)
*H04L 12/24* (2006.01)

(52) U.S. Cl.
CPC .......... *H04L 67/141* (2013.01); *H04L 67/146* (2013.01); *H04L 67/42* (2013.01);
(Continued)

(58) Field of Classification Search
CPC ..... H04L 67/141; H04L 67/146; H04L 67/42; H04L 41/0803; H04L 41/0806; H04L 41/0893; H04L 67/30; H04L 67/34
See application file for complete search history.

(56) References Cited

U.S. PATENT DOCUMENTS

| | | | | |
|---|---|---|---|---|
| 8,473,749 B1 * | 6/2013 | Madsen | ................. | H04L 67/34 713/187 |
| 8,689,303 B1 * | 4/2014 | Abidogun | ............... | H04L 63/08 709/223 |
| 8,706,800 B1 * | 4/2014 | Ahmed | ................... | G06F 9/468 709/201 |

(Continued)

OTHER PUBLICATIONS

International Search Report and Written Opinion for PCT Application No. PCT/2015/027965, dated Sep. 4, 2015.

(Continued)

*Primary Examiner* — Backhean Tiv
*Assistant Examiner* — Jihad K Boustany
(74) *Attorney, Agent, or Firm* — Banner & Witcoff, Ltd.

(57) ABSTRACT

Methods and systems for customizing applications in enterprise mobility management systems are described herein. A client agent software application on a mobile device may be customized to embed or make available enterprise server URLs, a session cookie for authentication, and various other data during the device enrollment process. The customization of the client agent may be based on the device, user, and/or enrollment session. After the device is enrolled in the enterprise system, the embedded data may be accessed by the client agent application to support seamless single-sign-on during first-time use. Additional customized applications based on device, user, and/or enrollment session, may be generated and provided to mobile devices during or after device enrollment. Customized applications may be based on application templates, such as packaged web applications or specific implementations of hosted applications.

16 Claims, 10 Drawing Sheets

(52) U.S. Cl.
CPC ...... *H04L 41/0803* (2013.01); *H04L 41/0806* (2013.01); *H04L 41/0893* (2013.01); *H04L 67/30* (2013.01); *H04L 67/34* (2013.01)

(56) References Cited

U.S. PATENT DOCUMENTS

| | | | |
|---|---|---|---|
| 2003/0065947 A1* | 4/2003 | Song | H04L 63/08 726/23 |
| 2008/0104684 A1 | 5/2008 | Lunde et al. | |
| 2009/0006861 A1 | 1/2009 | Bemmel | |
| 2010/0077216 A1 | 3/2010 | Kramer et al. | |
| 2013/0178190 A1 | 7/2013 | Celi, Jr. et al. | |
| 2013/0219176 A1* | 8/2013 | Akella | H04L 63/0815 713/165 |
| 2013/0254847 A1* | 9/2013 | Adams | G06F 21/6218 726/4 |
| 2013/0298215 A1* | 11/2013 | Kuznetsov | H04L 9/3263 726/8 |
| 2014/0082715 A1* | 3/2014 | Grajek | H04L 63/083 726/8 |
| 2014/0259093 A1* | 9/2014 | Narayanaswamy | H04L 67/306 726/1 |
| 2015/0026675 A1* | 1/2015 | Csaszar | G06F 8/61 717/178 |
| 2015/0199193 A1* | 7/2015 | Balasubramanian | G06F 8/654 717/169 |

OTHER PUBLICATIONS

Jul. 25, 2018—(EP) Examination Report—App 15724816.2.
Dec. 21, 2017—(EP) Search Report—App 15724816.2.
Jun. 12, 2019—(EP) Examination Report—App. 15724816.2.
Oct. 18, 2019—(EP) Decision to Grant—App. 15724816.2.

* cited by examiner

APPLICATION CUSTOMIZATION

CROSS-REFERENCE TO RELATED APPLICATIONS

This non-provisional application claims priority to U.S. Provisional Patent Application Ser. No. 61/988,437, filed May 5, 2014, and entitled "Application Customization," the contents of which are incorporated by reference in their entirety in this disclosure.

FIELD

Aspects of the disclosure relate to computer hardware and software. In particular, one or more aspects of the disclosure generally relate to computer hardware and software for generating customized applications for user devices in enterprise systems.

BACKGROUND

Mobile devices, such as smart phones, personal digital assistants, tablet computers, other types of mobile computing devices, are becoming increasingly popular. Mobile devices are used in personal and business settings for a variety of purposes. Users of mobile devices may want their devices to be personal and interactive, and suitable both as personal consumer devices and as business devices, and will often customize their mobile devices by installing various mobile software applications suitable to their purposes.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards generating and providing customized applications for user devices in enterprise systems.

One or more aspects of the disclosure provide for methods, apparatuses, and computer systems directed toward receiving enrollment requests from one or more mobile devices to enroll in an mobile device management (MDM) system, generating session cookies based on device identifiers of the mobile devices and based on identifiers of the MDM system, and providing the session cookies to the mobile devices. Such session cookies, in accordance with various aspects of the disclosure, may be unique to mobile devices, users of the mobile devices, and/or specific enrollment sessions of the mobile device into the MDM system. According to additional aspects, the session cookies may be provided to the mobile devices by transmitting the session cookies using an MDM protocol during the enrollment process. Additionally or alternatively, session cookies may be provided to the mobile devices by embedding the session cookies into client agent applications which then may be built and transmitted to the respective mobile devices.

According to further aspects of the disclosure, the mobile devices may use the session cookies to establish communication with the MDM system during an enrollment session. In certain examples, a mobile device may transmit a communication containing a session cookie to facilitate the enrollment process. After receiving the session cookie from the mobile device, a server in the MDM system may determine whether the session cookie is valid based on a retrieved expiration time associated with the session cookie.

Further aspects of the disclosure are directed to identifying one or more of a user, a device, or an enrollment session associated with an enrollment request received from a mobile device, determining a set of customized application parameters based on the user, device, or enrollment session, generating a customized application using the set of customized application parameters and an application template, and then transmitting the customized application to the mobile device in response to the enrollment request.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards customizing applications in enterprise mobility management systems. Various situations and use cases are described in which enterprise applications may be customized for users within an enterprise system, and various techniques and examples are described for customizing such applications. In some cases, a client agent software application on a mobile device may be customized during the device enrollment process to embed or make available enterprise server URLs, a session cookie for authentication, and various other data. The customization of the client agent may be based on the device, user, and/or enrollment session. After the device is enrolled in the enterprise system, the embedded data may be accessed by the client agent application to support seamless single-sign-on during first-time use. Additional customized applications based on device, user, and/or enrollment session, may be generated and provided to mobile devices during or after device enrollment. Customized applications may be based on application templates, such as packaged web applications or specific implementations of hosted applications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
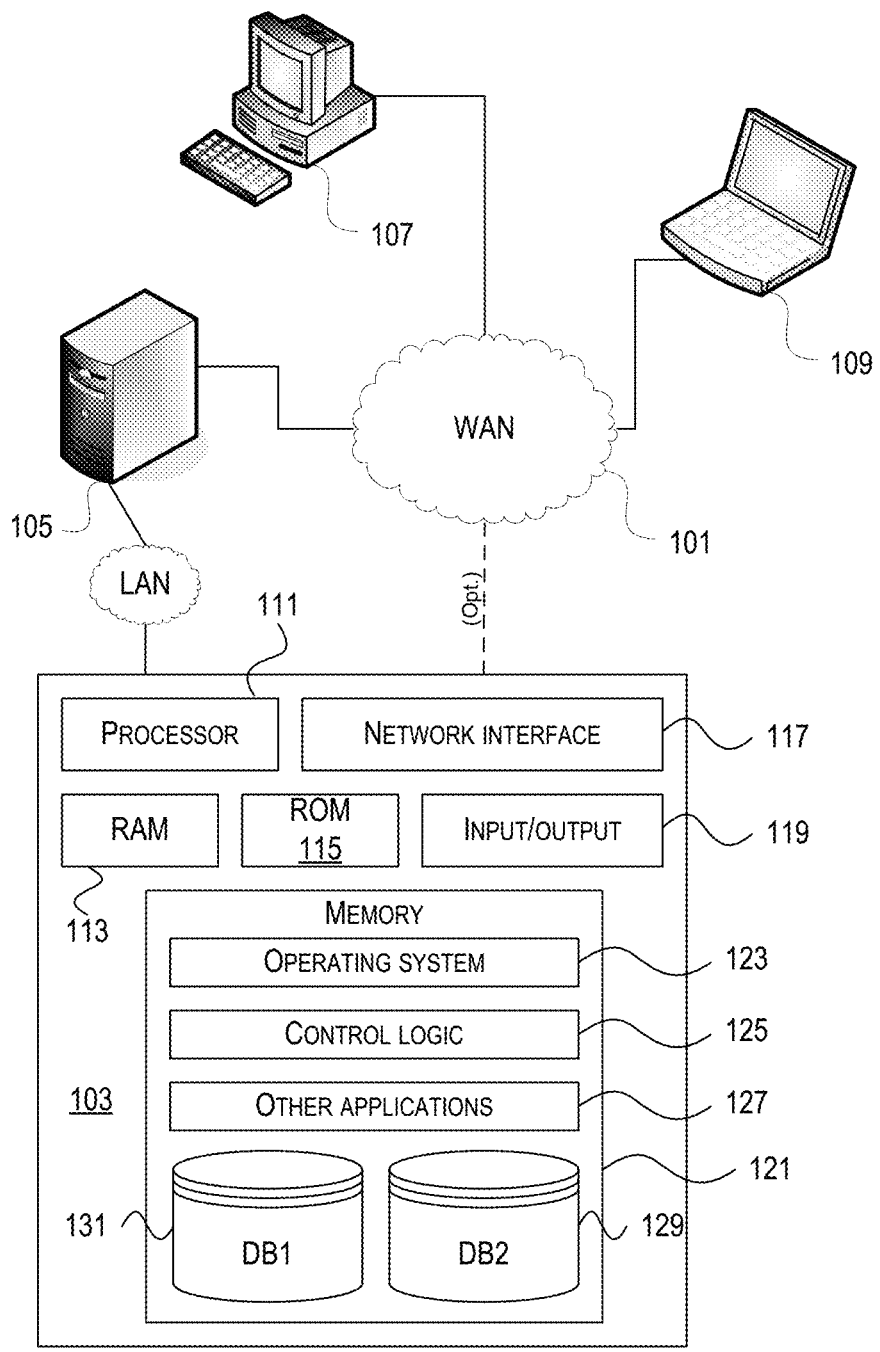
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
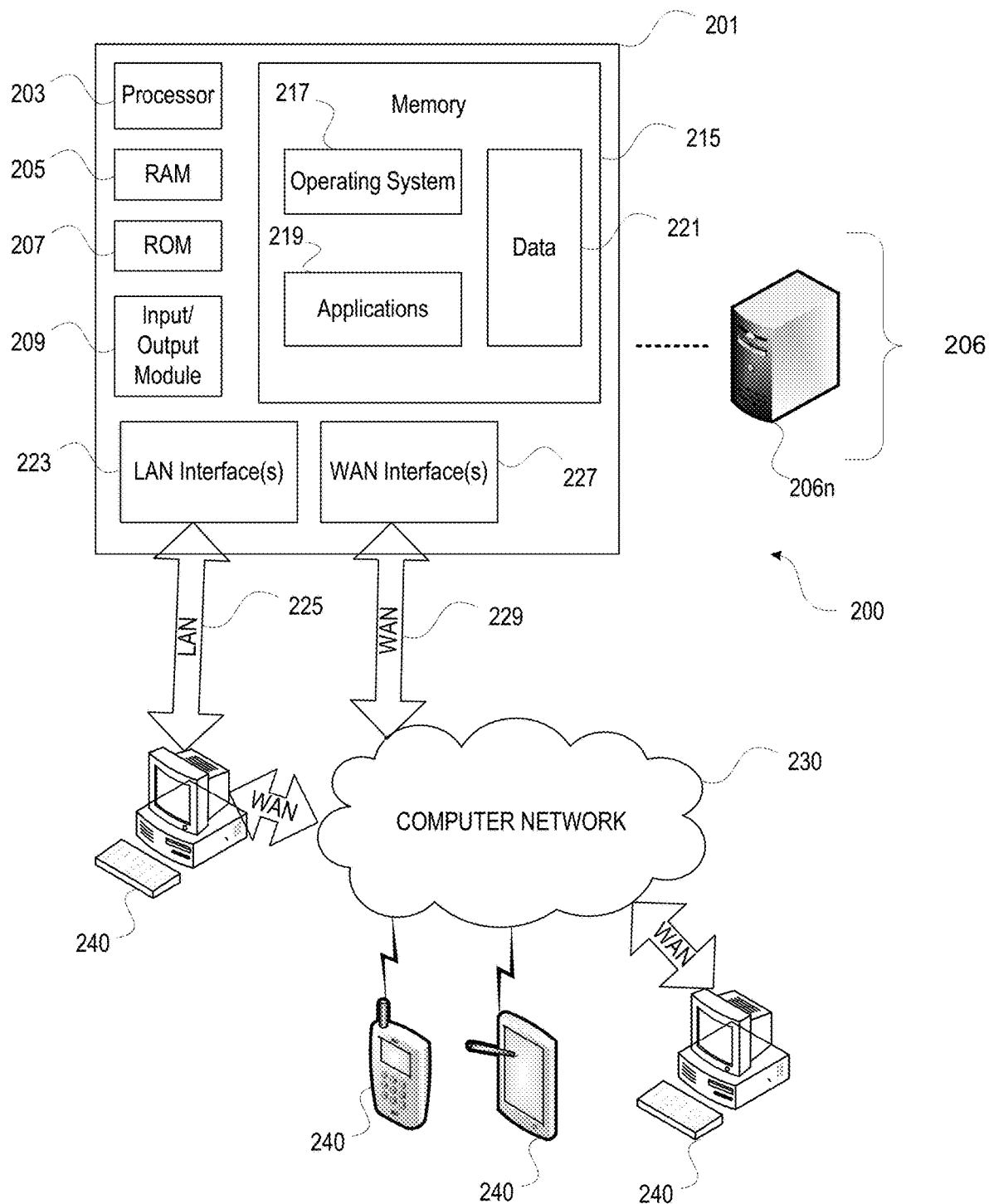
FIG. 2 depicts an illustrative remote-access system architecture that may be used in accordance with one or more illustrative aspects described herein.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106a, and responds to the request generated by the client machine 240 with a response from the second server 106a. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
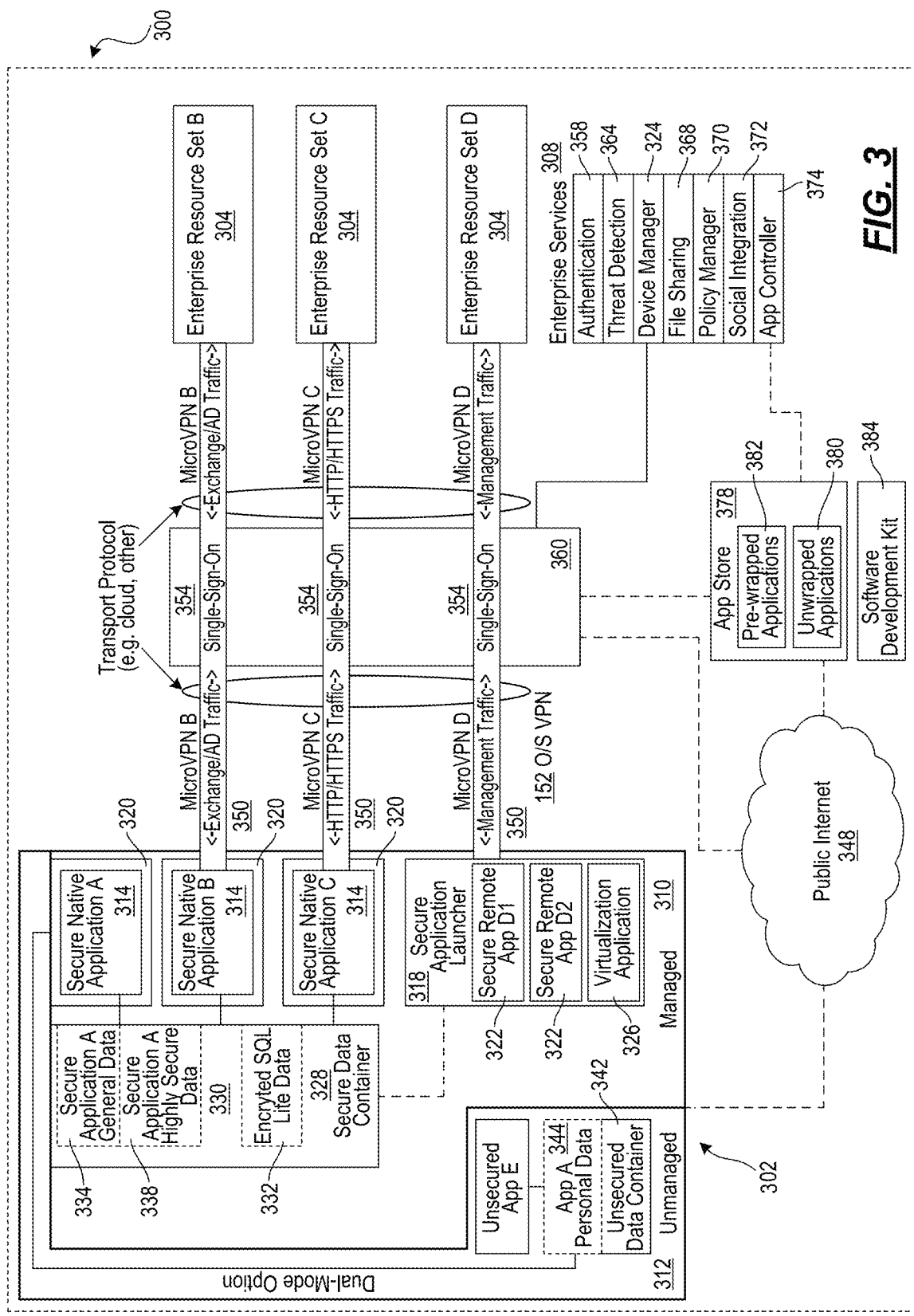
FIG. 3 depicts an illustrative enterprise mobility management system.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Windows operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like 352. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
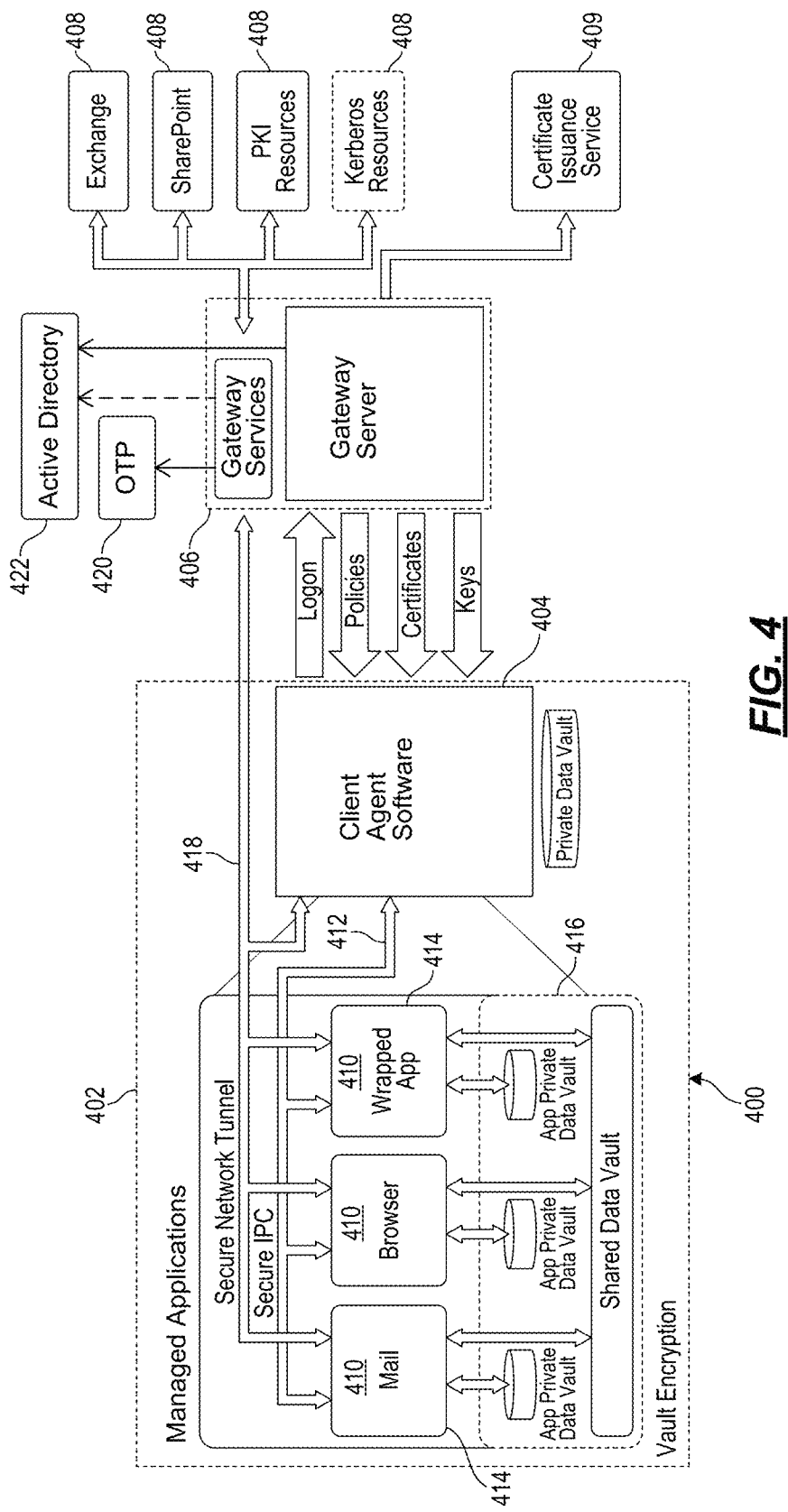
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 with a client agent 404, which interacts with gateway server 406 (which includes Access Gateway and application controller functionality) to access various enterprise resources 408 and services 409 such as Exchange, Sharepoint, public-key infrastructure (PKI) Resources, Kerberos Resources, and Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and the application management framework (AMF) of this architecture act to provide policy driven management capabilities and features such as connectivity and SSO (single sign on) to enterprise resources/services 408. The client agent 404 handles primary user authentication to the enterprise, normally to the Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through the Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Application Customization

FIGS. 5-10, and the sections below, illustrate various embodiments and examples relating to customizing applications in enterprise mobility management systems. Some examples are described in reference to mobile applications for devices, such as mobile phones, personal digital assistants (PDAs), tablet, and laptop computers. However, it should be understood that the concepts described herein are not limited to mobile applications and mobile devices, but may be applied to other types of computing devices as well. For example, customized software applications may be developed for and distributed to personal desktop computers and other non-mobile computing devices, using similar (or the same) techniques described below for mobile applications and mobile devices. Customized applications also may be developed for and distributed to devices on other software platforms, such as television-based platforms (e.g., ANDROID applications for GOOGLE TV, etc.), automobile-based or vehicle-based software platforms, and the like, using similar or the same techniques described below for mobile applications and mobile devices (e.g., software development and modification tools, etc.).

Figure 5:
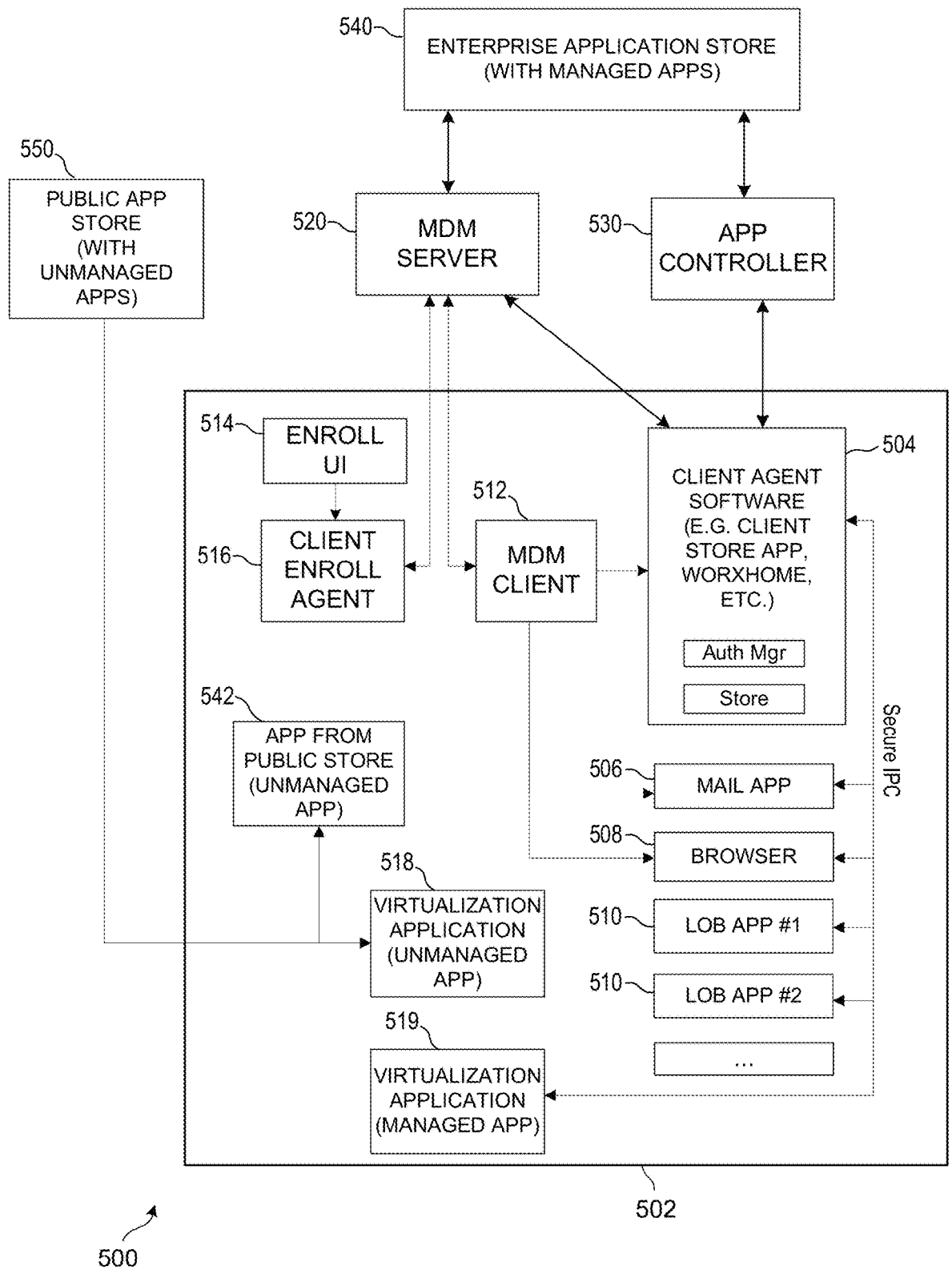
FIG. 5 depicts another illustrative enterprise mobility management system.

Referring now to FIG. 5, another example is shown of an enterprise mobility management system 500. Some of the components of the mobility management systems 300 and 400, described above, have been omitted for the sake of simplicity. The architecture of the system 500 depicted in FIG. 5 is similar in many respects to the architecture of the systems 300 and 400, described above, and may include additional features not mentioned above.

In this example, enterprise mobility management system 500 includes a mobile device 502 including a client agent application 504. In some embodiments the client agent application 504 may be known as, for example, a master managed application, a client store application, or WorxHome from Citrix. The client agent 504 may interact with various external systems, such as a Mobile Device Management (MDM) server 520, and an application controller 530 to access various enterprise resources. For example, the client agent 504 may access the enterprise application store 540 to allow selection and downloading of applications. The client agent may interact with these resources and other enterprises resources through a gateway server (e.g., including Access Gateway), not shown in FIG. 5. The enterprise application store 540 may contain managed native applications, HDX (remotely hosted/virtual) applications or desktops, Web and SaaS apps. The enterprise application store 540 may also contain links, such as URLs or pointers, to the public application store 550 with unmanaged applications, thus allowing the client agent 504 to also install unmanaged public store applications. For example, a native virtualization application, e.g., a client agent such as CITRIX RECEIVER, may be selected, downloaded and installed either as a managed application 519 from the enterprise application store 540 or as an unmanaged application 518 from the public application store 550. In addition both managed and unmanaged versions of a virtualization application or any other native application may be installed at the same time on the mobile device 502. In come embodiments, the Mobile Device Management (MDM) server 520 and the application controller 530 could be combined into one server component. In some embodiments, multiple instances of Mobile Device Management (MDM) server 520 and application controller 530 may exist in a cluster for reasons of load-balancing or fault-tolerance.

The client agent 504 also may support the installation and management of applications on the mobile device 502, such as native iOS, Android, Windows or Windows Phone applications. In this example, the mobile device 502 includes a mail application 506, browser application 508, at least two line-of-business (LOB) applications 510, and a managed version of a virtualization application, e.g., a client agent such as CITRIX RECEIVER, as another LOB application. These applications may be native applications that execute locally on the device, and may be managed by the client agent 504 and/or the AMF to provide policy driven management capabilities and features such as connectivity and SSO to various enterprise resources/services. In some cases, the client agent 504 may handle primary user authentication to the enterprise resources and obtain policies from gateway server 406 to control the behavior of the managed applications 410 on the mobile device 402. The Secure IPC links between the client agent 504 and native applications 506-510 and 519 may represent a management channel to allow the client agent 504 to supply policies to be enforced by an application management framework, thereby "wrapping" the native applications 506-510 and 519.

Prior to downloading and configuring the client agent 504 and other applications 506-510 and 519, the device 502 first may be enrolled in the system 500 using a Mobile Device Management (MDM) system service. The processes by which mobile devices 502 may enroll in enterprise mobility management systems 500 are described in more detail below in reference to FIGS. 6-8. In some cases, the mobile device 502 may include an enrollment user interface 514 and/or client enrollment agent 516 to handle device enrollment and unenrollment into various enterprise systems 500. For example, certain mobile operating systems may include an enrollment user interface 514 and client enrollment agent 516 configured to handle all device enrollment. In other cases, an enrollment user interface 514 and/or client enrollment agent 516 may not be present on the device, in which case the device may contact an enterprise resource (e.g., Mobile Device Management (MDM) server 520) to enroll in the enterprise mobility management systems 500. After enrollment of the device 502, the client agent 504 and other applications may use an MDM client 512 to interact with the MDM server 520.

Figure 6:
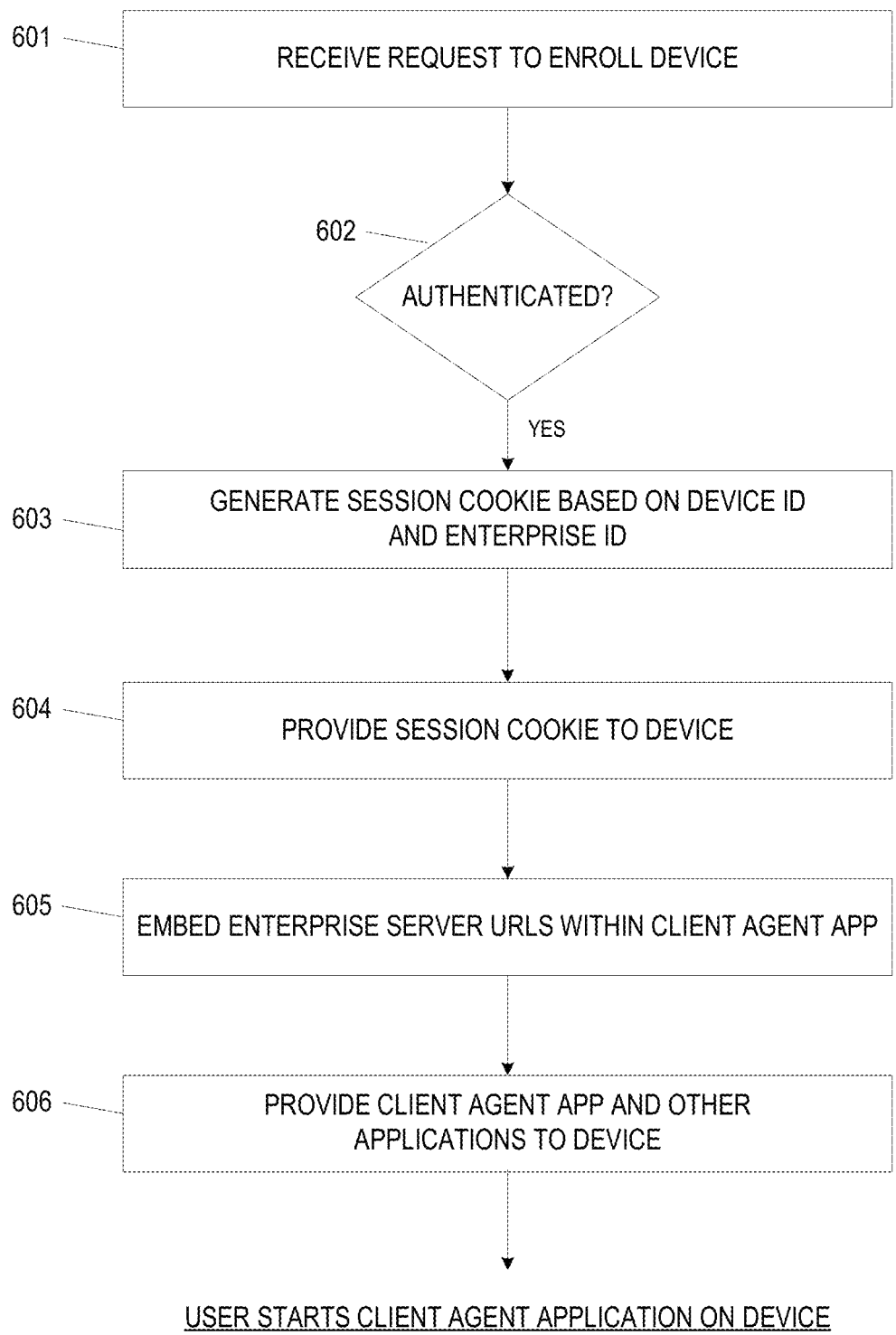
FIG. 6 is a diagram showing an example process of enrolling a user device into an enterprise system, in accordance with one or more illustrative aspects described herein.
Figure 7:
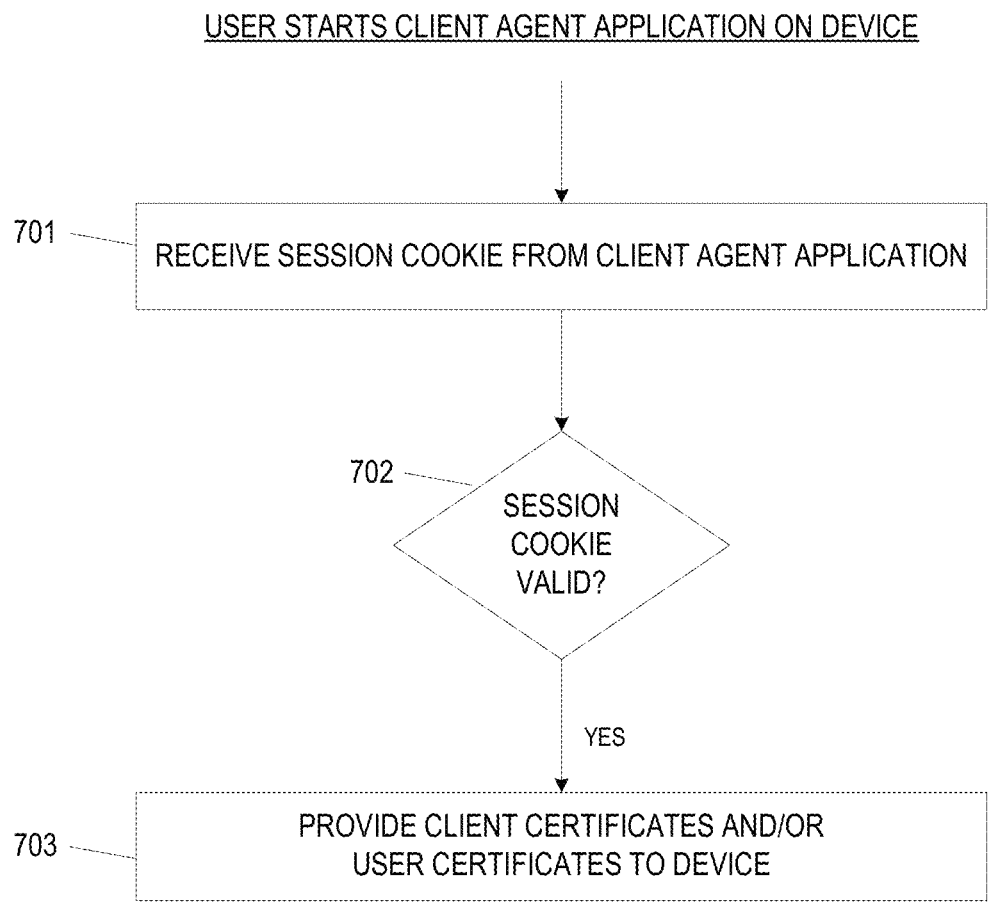
FIG. 7 is a diagram showing an example process of providing MDM configuration data to a user device in response to an initial launch of a client agent application after enrollment of the device, in accordance with one or more illustrative aspects described herein.
Figure 8:
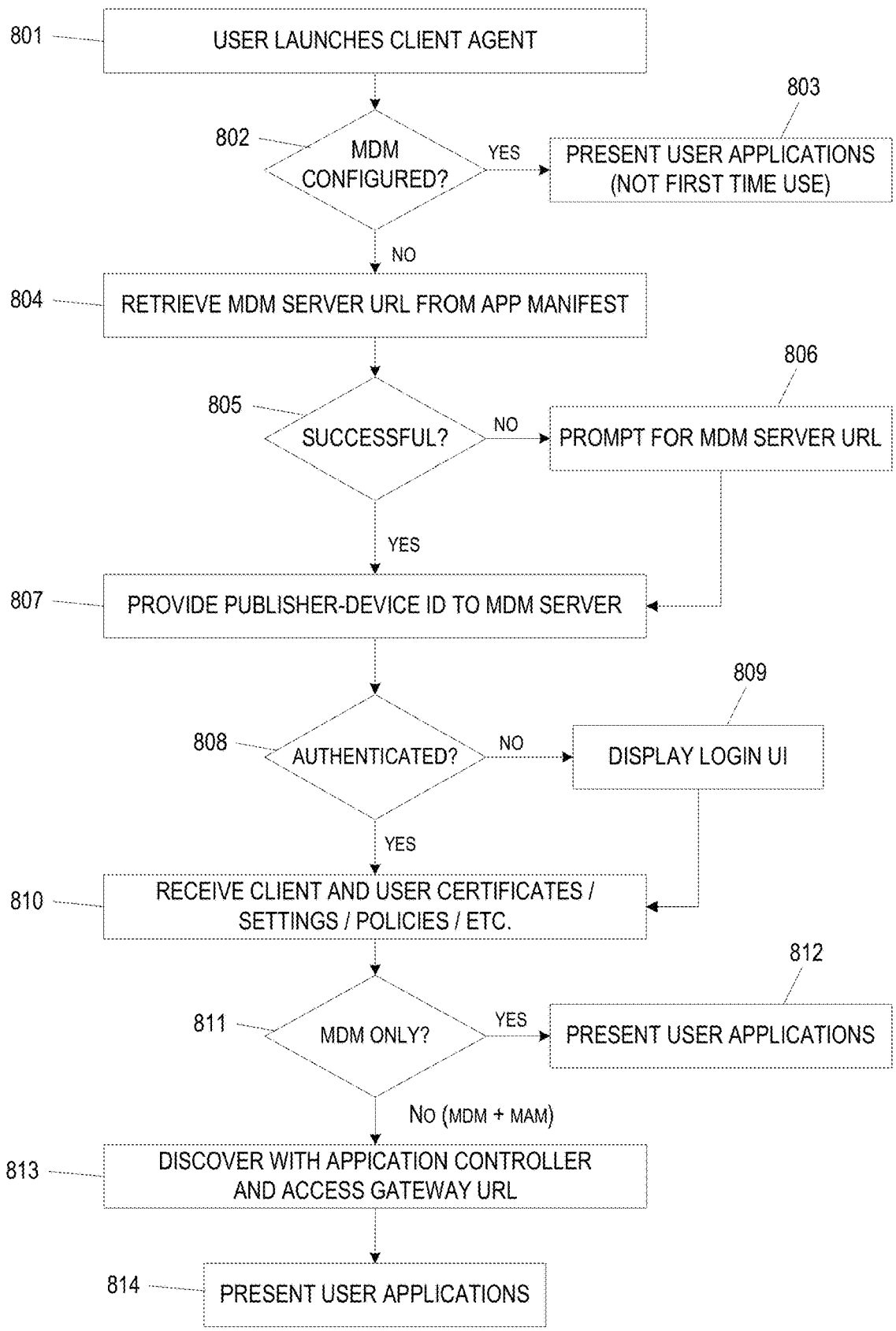
FIG. 8 is a diagram showing an example workflow process at a user device in response to an initial launch of a client agent application after enrollment of the device, in accordance with one or more illustrative aspects described herein.

FIGS. 6-8, discussed below, describe situations and use cases in which various applications 504-510 and 519 may be customized within an enterprise system 500. In certain examples, a client agent application 504 may be customized by an enterprise server (e.g., MDM server 520) in response to enrollment request by a device 502, before the client agent 504 is provided to the device 502. In other examples, other custom applications may be generated and provided to an enrolled device 502, by configuring template applications (e.g., generic web-browser applications, generic hosted applications, etc.) based on the specific device, user, and/or enrollment session.

Figure 9:
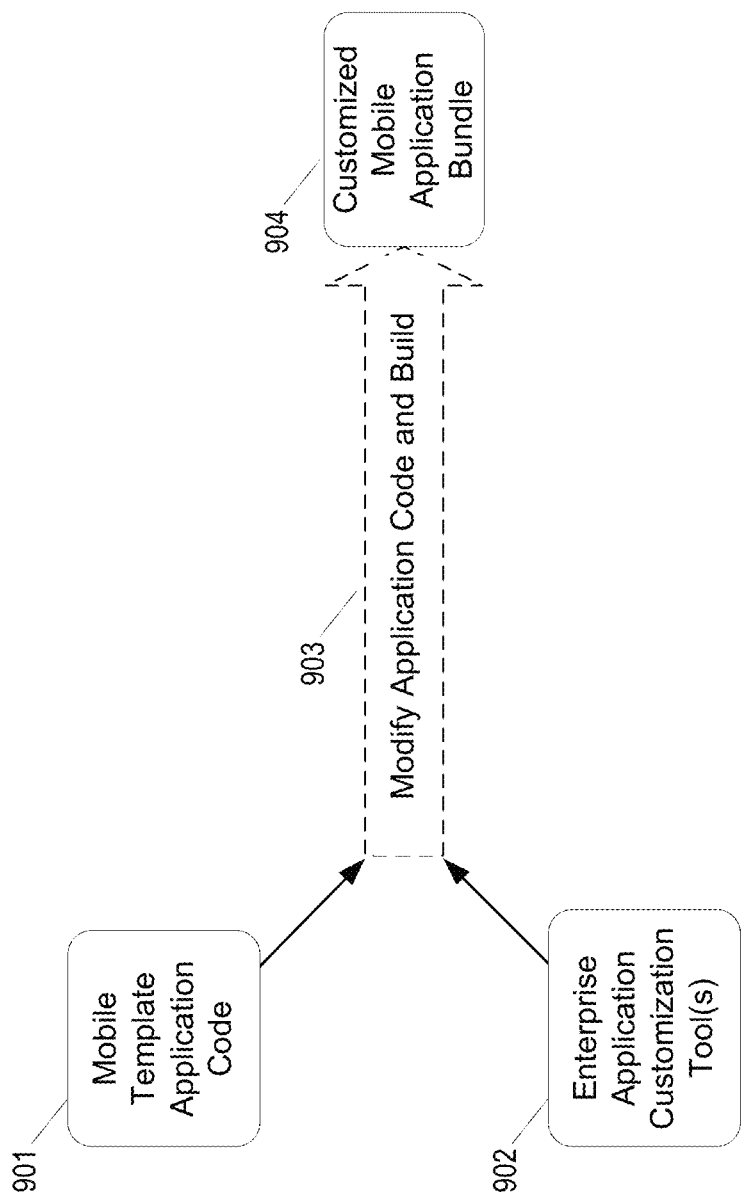
FIG. 9 is a diagram showing an example process building a customized mobile application bundle based on a mobile template application, in accordance with one or more illustrative aspects described herein.
Figure 10:
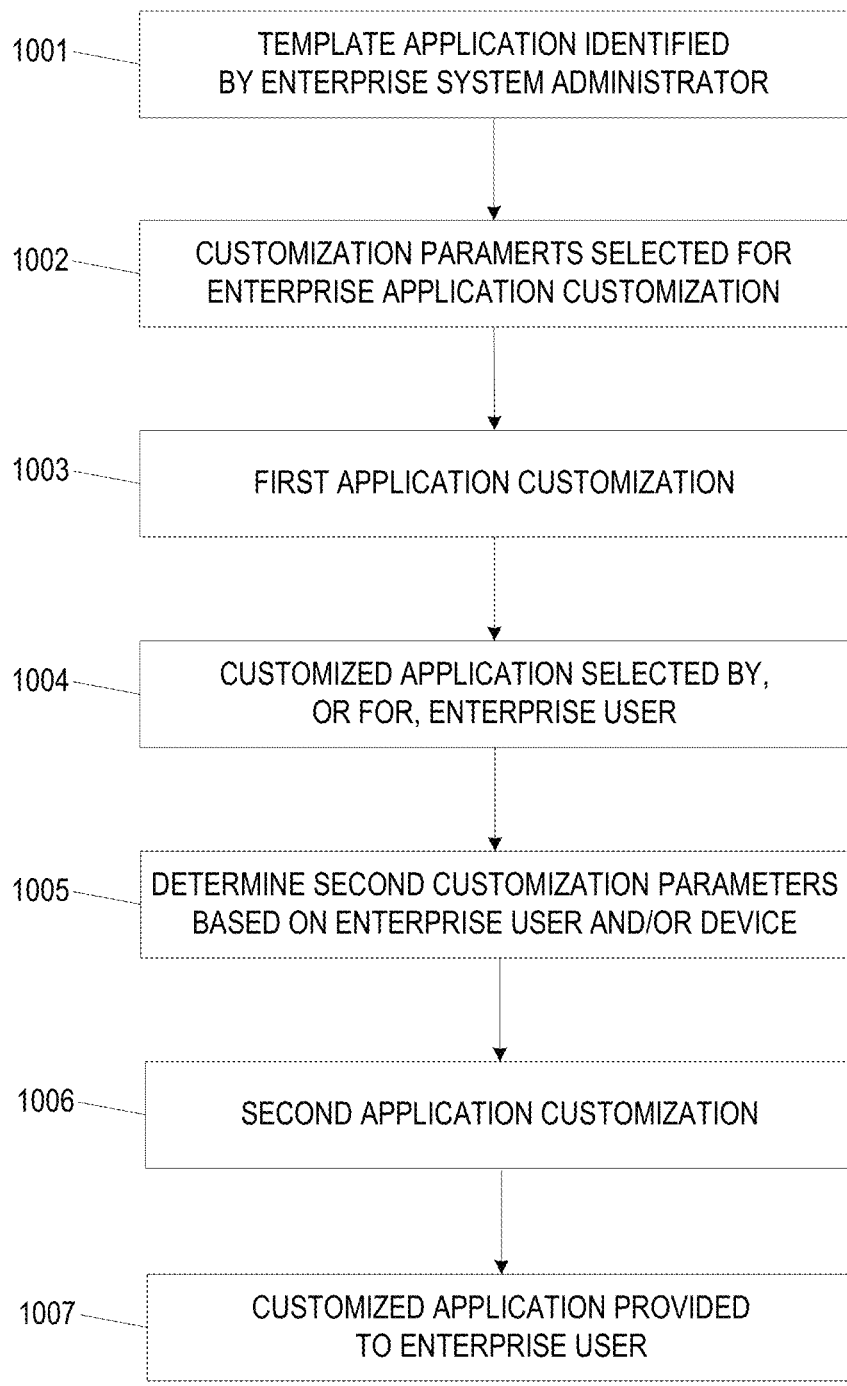
FIG. 10 is a diagram showing an example process of modifying and configuring a template application to create a new customized application, in accordance with one or more illustrative aspects described herein.

After describing various situations and use cases in which applications may be customized within an enterprise system 500, FIGS. 9-10 and corresponding paragraphs discuss techniques and examples of customizing applications.

Referring now to FIG. 6, an illustrative diagram is shown of a process of enrolling a user device into an enterprise system. The features and methods described below in reference to FIG. 6 may be performed by a computing device or combination of devices, such as the various computing devices and systems shown in FIGS. 1 and 2, and may be implemented within various different types of enterprise systems and other computing systems, such as the illustrative mobility management systems shown in FIGS. 3-5. For example, the steps of FIG. 6 may be described in reference to a new mobile device 502, such as a new smartphone, PDA, tablet computer, laptop computer, or the like, requesting enrollment in an enterprise system 500. System 500 may be a mobility management system of a company or other enterprise, and the steps discussed in FIG. 6 may be performed by one or more enterprise resources of the company, such as the MDM server 520, application controller 530, and/or enterprise application store 540.

In step 601, a request is received by an enterprise resource (e.g., MDM server 520) to enroll a client mobile device 502 into the enterprise mobility management system 500. Enrollment requests may be initiated by a user of the mobile device 502, for example, by selecting or typing in an enrollment URL link provided by the user's employer via an email, short messaging service (SMS) message, or other technique, to invite the user to enroll in the company's enterprise mobility management system 500. Enrollment requests may also be initiated by a user of the mobile device 502 by directly launching the enrollment user interface 514, which may invoke the client enrollment agent 516. For example, a user of a Windows Phone device may directly go to the phone Settings menu and launch the Company Apps or Workplace menu to enroll the device by adding an enterprise (workplace) account. The enrollment URL may also be retrieved from the MDM server 520 or another enterprise network service using an e-mail-based discovery, for example based on domain name system (DNS) lookup query. The enrollment URL may correspond to the MDM server 520 or other enterprise resources (e.g., the application controller 530, an access gateway, etc.) In step 602, after receiving the enrollment request from the device 502, the MDM server may require the device user to authenticate with valid user credentials (e.g., a company network username and password, or e-mail address and password). Validation of user credentials may be handled by the MDM server 520, or a gateway server including gateway services.

In step 603, if the user credentials received from the mobile device 502 are valid (602:Yes), the MDM server 520 may generate a unique session cookie based on a device identifier of the requesting device 502 and/or an enterprise identifier (or publisher identifier) associated with the specific enterprise (e.g., the employer, company, or other entity controlling the enterprise system 500). The MDM server 520 may generate the session cookie (e.g., an encryption key or other unique number) using both the unique device ID and a unique enterprise/publisher ID. Therefore, different devices 502 enrolling into the same enterprise 500 may receive different session cookies, and the same device 502 enrolling into the different enterprises 500 may receive different session cookies. Additionally, in some cases, the session cookie generated in step 602 may be unique to an enrollment session, so that the same device 502 requesting enrollment in the same enterprise 500 on multiple different occasions (e.g., after a delay or unenrollment) may receive different session cookies during the different enrollment processes.

In step 604, the session cookie generated by the MDM server 520 may be provided or otherwise made available to the mobile device 502. In some cases, MDM server 520 may transmit the session cookie to the mobile device 502 during device enrollment using an MDM protocol. The mobile device 502 and/or the MDM client 512 may securely store the session cookie such that it is available only to the client agent application 504, or such that the session cookie may be available to the client agent 504 and/or other native and LOB applications 506-510 and 519. In other examples, the session cookie may be embedded into the client agent application 504 at the MDM server 520 before the client agent 504 is provided to the device 502 in step 606, thereby creating a customized client agent 504 by wrapping the client agent 504 with the session cookie to allow the client agent 504 to automatically access the MDM server 520 with a seamless SSO during a first-time use (FTU) of the client agent 504 after enrollment. In some embodiments, wrapping or embedding of the session cookie into the client agent application 504 may be the preferred or the only available approach, e.g. if the MDM protocol and MDM client 512 are proprietary for the mobile device 502 and its operating system and cannot be modified or updated.

In step 605, the MDM server 520 may embed one or more enterprise URLs into the client agent 504, thereby creating a customized client agent 504 by wrapping the client agent 504 with the URLs to the enterprise servers and other resources that the device 502 is permitted to access within the enterprise system 500. For example, in some embodiments, the various URLs for enterprise servers and resources may be embedded in the application manifest file of the client agent 504. In other examples, the various enterprise URLs need not be wrapped into the client agent application 504, but may be made otherwise available. For example, the MDM server 520 may transmit the various URLs for enterprise servers and resources to the mobile device 502 during device enrollment using an MDM protocol. The mobile device 502 and/or the MDM client 512 may securely store the various URLs for enterprise servers and resources such that they are available only to the client agent application 504, or to the client agent 504 and/or other native and LOB applications 506-510 and 519. In some embodiments, wrapping or embedding of the various enterprise URLs into the client agent application 504 may be the preferred or only available approach, e.g. if the MDM protocol and MDM client 512 are proprietary for the mobile device 502 and its operating system and cannot be modified or updated.

In step 606, the MDM server 520 (and/or other resources in enterprise system) may complete the enrollment process by providing the client agent application 504 and/or other applications to the device 502. As noted above, the client agent 504 transmitted to the device 502 may be customized in various ways based on the device 502, user, and/or enrollment session. For example, the client agent 504 may be embedded with the unique session cookie, or may include software to access the unique session cookie from a secure memory of the device 502. The client agent 504 also may be embedded with various enterprise URLs to the MDM server 520, application controller 530, application store 540, and the like, or may include software to access the enterprise URLs from a secure memory of the device 502.

In other examples, the client agent application 504 may be customized to include other features to enable seamless SSO during first time use. For instance, a separate encryption key, different from the session cookie, may be embedded into the client agent 504 during enrollment. This embedded encryption key may be used to secure the IPC between the client agent 504 and other applications 506-510 and 519. Information instructing the client agent application 504 to set SSL certificate trust also may be embedded into a customized client agent 504 before or during the enrollment process.

Additional information, such as user certificates and application configuration information, also may be embedded into the client agent 504 before it is transmitted to the device 502. User certificates and application configuration information (e.g., mail server account configuration data) may allow the applications 504-510 and 519 on the device 502 to immediately access enterprise resources such as email servers, file share servers, and the like, without needing to authenticate or provide account configuration data to these enterprise resources during the initial access request.

First-time use policies also may be embedded into the client agent 504 during the enrollment process, for example, policies identifying which authentication methods should be used, the network and VPN settings, logging policies, data encryption and containment policies, and the like. By embedding first-time use policies that are specific to a user, device, and/or enrollment session into the client agent 504 before it is transmitted to the device 502, the enterprise applications 504-510 and 519 on the device may initialize offline, i.e., without a live network connection when an application is launched for the first time.

Additional data may be embedded into the client agent 504 during the enrollment process to configure the user interface, user experience behavioral settings, and branding of the client agent 504 and other applications 506-510 and 519. For example, the MDM server 520 may determine user-specific client agent preferences, such as subscribed applications, applications pinned to the start screen, arrangements of applications, background colors and UI preferences of applications, logging preferences, etc. The MDM server 520 may receive user interface and user experience preferences from other devices enrolled by the user into the enterprise system 500, while additional settings may be configurable by the user or an administrator for specific users, user groups, device types, etc.

As shown in step 606, other applications may be provided to the device 502 during or after the enrollment process, other than the client agent 504. Such applications may include mail applications 506, browser applications 508, various line-of-business applications 510, and a managed version of a virtualization application 519. The set of applications 506-510 and 519 provided to a device 502 upon enrollment, along with the configurations and customizations of those applications, may depend on the user, device, and enrollment session. Factors such as the capabilities of the device 502, the employee's title, security clearance level, seniority within the company, etc., may be used to determine the set of applications 506-510 and 519 and configure the applications during enrollment process. The same or similar configuration and customization use cases and data embedding techniques discussed already for the client agent 504 can also be applied to other managed applications, such as the set of managed LOB applications 506-510 and 519.

As indicated at the bottom of FIG. 6, steps 601-606 may be performed during the device enrollment process, prior to the initial launch by the user of the client agent 504 on the device 502. Referring now to FIG. 7, steps 701-703 may be performed by the MDM server 520 and/or other enterprise servers or resources after the enrollment of the device 502 in the enterprise system. For example, the features and examples discussed below in reference to FIG. 7 may be performed in response to the initial launch by the user of the client agent application 504 after enrolling the device 502.

In step 701, after user initially launches the client agent application 504 after enrolling device 502, the client agent 504 may automatically initiate a communication session with the MDM server 520 or other enterprise resources. As discussed above in FIG. 6, the appropriate enterprise URLs may be embedded with the client agent 504, or otherwise made available to the client agent 504 (e.g., in the secure memory), during enrollment. Therefore, when the user initially launches the client agent 504, the user need not determine or manually input the URL to connect to any available enterprise resources. Instead, the client agent 504 may be configured to automatically retrieve the URL of the MDM server 520, application controller 530, access gateway, or the like, and initiate communication without any explicit action from the user. The communication received from the client agent 504 in step 701 also may include the unique session cookie generated during (or before) the enrollment process for the device 502. As discussed above, the session cookie may be an encryption key or other unique number generated by the MDM server 520 during enrollment, based the device ID and an enterprise/publisher ID.

Because the session cookie is only provided to the device 502 after a successful user authentication (see steps 602 and 604) during the enrollment process, a validation of the session cookie by the MDM server may confirm the user's identity and access permissions. Accordingly, in step 702, the MDM server 520 may compare the session cookie received from the device 502 to the session cookie created in step 603, in order to authenticate the user and device. In some cases the steps of FIG. 6 may be performed by one enterprise resource (e.g., MDM server 520), while the steps of FIG. 7 may be performed by a different enterprise resource (e.g., application controller 530 and/or an access gateway). In such examples, after creating the session cookie in step 603, the MDM server 520 may transmit or otherwise make available the session cookie to the application controller 530 and other enterprise resources.

Thus, by comparing the session cookie received from the device 502 in step 702, to the session cookie created during enrollment of the device in step 603, the MDM server 520 may authenticate the device automatically and without needing the user to re-input authentication credentials. However, as noted above, in some cases the session cookie may be available to other applications 506-510 and 519 on the device 502. Therefore, one or more additional features may be implemented during the session cookie validation in step 702, in order to prevent a malicious application on the device from accessing the MDM server 520 or other enterprise resources (e.g., a malicious LOB application 510 pretending to be the client agent 504 by using the session cookie). In order to protect against such security breaches, in some cases, the session cookie may be embedded directly into the client agent 504 so that it is inaccessible to any other application 506-510 and 519. In such cases, because the session cookie could not be used for secure IPC between the client agent 504 and other applications 506-510 and 519, a different shared encryption key may be generated for performing secure IPC between applications 504-510 and 519. In other examples, the session cookie may be made available to other applications 506-510 and 519 on the device 502 (and thus may be used for the secure IPC), but the client agent 504 may be embedded during enrollment with another shared secret (e.g., a unique number or certificate) that also may be transmitted by the device in step 701 and validated by the MDM server 520 in step 702, in order to confirm that a malicious application is not posing as the client agent 504.

Additionally, in some implementations, unique session cookies generated before or during the enrollment process for a device may have configurable expiration times. The expiration times may be based on the time the device was enrolled and the session cookie was provided to the device 502. If the user does not launch the client agent 504 within the determined time window (e.g., 1 hour, 2 hours, 1 day, etc.), then the MDM server 520 will expire the session cookie, and the user may be prompted to input valid authentication credentials during first time use in order to authenticate successfully. Alternatively, the device 502 may re-enroll and receive a newly generated session cookie, and then launch the client agent 504 to automatically connect to the MDM server 520. In some embodiments the client agent 504 may be launched automatically, i.e. without explicit user action, immediately after the client agent 504 is provided to the mobile device 502 as part of the enrollment process in step 606. For example, the client agent 504 may be launched by the MDM client 512. In other examples, the client agent 504 may be launched by the mobile device 502 in response to push notifications issued by the MDM server 520 or application controller 530 or another enterprise service. In some embodiments the automatic launch of the client agent 504 could be configured to occur prior to the expiration of the session cookie, thus ensuring that the user does not have to input authentication credentials again or initiate re-enrollment of the device 502.

In step 703, after a successful validation of the session cookie (702:Yes), the user's identity has been established and the MDM server 520 may provide the device 502 with one or more client certificates and/or user certificates to use for future authentication to the MDM server 520 and other enterprise resources. Client certificates, unlike session cookies, may be longer lasting and might not have an expiration date. Client certificates may be used by the client agent 504 for future requests to the MDM server 520. Similarly, user certificates may allow the various applications 504-510 and 519 to authenticate to different protected resources within the enterprise system 500, such as email servers, file share servers, and the like. Applications 504-510 and 519 may use different user certificates, and multiple certificates may be supported to match various levels of security and/or separation requirements. For example, user certificates may be used by the mail application 506 and browser application 508, along with LOB applications 510 and a managed version of a virtualization application 519 that use web-service style communication patterns with https requests mediated by the AMF.

Additionally, in step 703, the applications 504-510 and 519 installed on the device 502 may be configured to use the various client certificates and/or user certificates received from the MDM server 520, without any explicit action by the user except for the initial launch of the client agent application 504. As discussed above in FIG. 6, client certificates, user certificates, and/or application configuration information may be embedded within the client agent 504, or otherwise provided to the device 502 during enrollment. In these examples, any such client certificates, user certificates, and/or application configuration information made available to the device 502 during enrollment need not be transmitted in step 703.

Referring now to FIG. 8, an illustrative diagram is shown of a process performed in response to the initiation of a client agent application 504, after enrollment of a device 502 in an enterprise system 500. Steps 801-814 in FIG. 8 may be performed by the client agent application 504 on the mobile device 502. These steps may generally correspond to the steps 701-703 in FIG. 7, which are concurrently performed on the MDM server 520.

In step 801, a user may launch a client agent 504 (e.g., a company hub software application) on the mobile device 502. In some embodiments, in step 801, the client agent 504 may be launched automatically. For example, as discussed above in FIG. 7, the client agent 504 may be launched by the MDM client 512, or by the mobile device 502 in response to push notifications issued by the MDM server 520 or application controller 530 or another enterprise service. In step 802, the client agent 504 may determine if Mobile Device Management (MDM) has been configured for the device 502. If the device 502 has been MDM configured (802:Yes), that indicates that the device has previously been successfully enrolled and provisioned with the appropriate applications, client and user certificates, configuration settings, policies, etc., within the enterprise system 500. In this case, there is no need for the device 502 to contact the MDM server 520, and in step 803 the enterprise applications available to the user are presented via the client agent 504.

If the device has not been MDM configured (802:No), that may indicate a first-time use of the client agent 504, in which case addition functions may be required to configure the device 502 for Mobile Device Management usage. In step 804, the client agent 504 may attempt to retrieve the URL of the MDM server 520 from its application manifest. As discussed above in FIG. 6, the URL of the MDM server 520 and/or additional URLs of enterprise resources may be added to secure memory on the device 502, embedded into the client agent application 504, or otherwise made available to the device 502 during enrollment. In this case, if the client agent 504 cannot retrieve the URL of the MDM server 520 (805:No), then it may be configured to prompt the user to enter the URL in step 806. However, if the client agent 504 successfully retrieves the URL of the MDM server 520 (805:Yes), then it may initiate a communication session with the MDM server 520 and provide a publisher-device ID to the MDM server 520 in step 807. The publisher-device ID in this example may correspond to a unique session cookie provided to the device during enrollment, or other unique number based on the device ID and an enterprise ID (or publisher ID).

After the MDM server 520 receives the publisher-device ID, it may respond to the client agent 504 indicating whether or not the publisher-device ID (e.g., session cookie) was successfully validated by the MDM server 520. Examples of validating session cookies by the MDM server 520 are discussed above in reference to step 702. If the MDM server 520 indicates that the publisher-device ID was not successfully authenticated (808:No), then the client agent 504 may be configured to prompt the user to manually input user credentials in step 809 for authenticating to the MDM server 520. However, if the MDM server 520 indicates that the publisher-device ID was successfully authenticated (808: Yes), then the client agent 504 may connect to the MDM server 520 to retrieve the appropriate MDM configuration data for the device and user in step 810. The MDM configuration data retrieved in step 810 may include, for example, client certificates, user certificates, application settings, enterprise policies, etc., which may be based on the specific user, user group, device, or other factors. Additionally, one or more custom applications may be provided to the mobile device 502 in step 810.

In step 811, the client agent 504 determines if the device 502 is configured for MDM only, or for both MDM and Mobile Application Management (MAM) capabilities. If the device 502 is configured only for MDM (811:Yes), then the initial MDM configuration of the device 502 is complete, and the enterprise applications available to the user may be presented via the client agent 504 in step 812. If the device 502 is configured for both MDM and MAM (811:No), then in step 813 the client agent 504 initiates a communication session and discovery process with the application controller 530 and/or access gateway, and the enterprise applications available to the user may be presented via the client agent 504 in step 814.

As discussed above, FIGS. 6-8 describe various situations and use cases in which enterprise applications may be customized for users within an enterprise system. In a first set of use cases and examples, FIGS. 6-8 describe customizing a client agent software application 504 in various ways, after receiving a device enrollment request. For example, URLs corresponding to MDM servers 520, application controllers 530, gateways, and other enterprise system resources, may be embedded in a client agent application 504 before providing the client 504 to a user's device 502. The client agent 504 also may be customized by embedding (or otherwise making available) a session cookie based on a device identifier and/or enterprise identifier, to support seamless SSO during first-time use. Other examples of customizing the client agent 504 before it is provided to an enrolled mobile device 502 are described above. The same or similar configuration and customization use cases and data embedding techniques discussed already for the client agent 504 can also be applied to other managed applications, such as the set of managed LOB applications 506-510 and 519. Some customizations could be transferred from the client agent 504 into managed LOB applications 506-510 and 519 at the mobile device 502 via the AMF and Secure IPC. However, it is beneficial for LOB apps to be customized prior to deployment, so that such customizations could take effect immediately upon LOB app launch and first time use, and before any interactions of a LOB app with the client agent 504, or any enterprise service, which requires network access. For example, a LOB app can be customized with secure by default policies, shared encryption keys for secure IPC with the client agent 504 and other managed apps, etc. Additionally, in a second set of use cases, other enterprise applications may be customized to appear as native applications after deployment on the user's device 502. Such customized applications may include packaged web applications (e.g., based on a generic web browser application) or specific implementations of hosted applications in an enterprise data center (e.g., based on a client agent application).

Having described various situations and use cases in which enterprise applications may be customized within an enterprise system, FIGS. 9-10 and the following paragraphs describe techniques and examples of customizing applications.

Referring now to FIG. 9, an illustrative diagram is shown of a process of building a customized mobile application bundle based on a mobile template application. The features and methods described below in reference to FIG. 9 may be performed by a computing device or combination of devices, such as the various computing devices and systems shown in FIGS. 1 and 2, and may be implemented within various different types of enterprise systems and other computing systems, such as the illustrative mobility management systems shown in FIGS. 3 and 4.

The example build process shown in FIG. 9 accepts mobile application code 901 and enterprise application customization software tools 902. The mobile application code 901 in this example may correspond to one or more executable software components or to application code that has not been built into an executable component. For example, the mobile application code 901 may be an executable native mobile application built by an organization for use within the organization, or built and distributed by an independent software vendor (ISV). In such cases, the mobile application code 901 may correspond to a previously published executable application, which has been signed and certified for distribution through one or more application stores. Alternatively, the mobile application code 901 may be unbuilt software code, for example, code during an application development process. Additionally, as discussed below, the mobile application code 901 may correspond to a template application, such as a configurable stub application designed to allow users to easily create customized mobile applications for enterprise systems. Such template applications may themselves be executable applications (e.g., a generic or stub web browser application, a generic or stub single-session client execution environment application, etc.), or may take the form of a template application factored out into a binary software development kit (SDK).

The enterprise application customization software tools 902 in FIG. 9 may be a software toolkit provided to organizations, ISV's, or other software application developers. In some examples, the software tools 902 may include a header file and library to allow application developers to create customized mobile applications for enterprise systems. The tools 902 library may include application programming interfaces written in C, Objective-C, C++, C#, or other suitable programming language. In some cases, the customization software tools 902 may include a command-line executable tool 902 that receives an input parameter identifying a mobile template application 901, and additional input parameters specifying one or more features for the customized application, such as the customized application name, bundle identifier, application icons, friendly names, application service URIs, application specific policies, etc. Customization tools 902 may then generate the customized application package, for example, a .IPA executable for APPLE mobile devices, a .APK executable for GOOGLE ANDROID mobile devices, a .XAP or .APPX executable for Windows Phone or Windows mobile devices, etc. In other examples, the customization tools 902 may include a wizard 902 or other user interface screens to allow users to specify the various features for the customized application. In still other examples, the software tools 902 need not include a command-line tool or a wizard, but instead (or in addition to) may be implemented as a service. For example, a service 902 containing the functionality to update or convert a mobile template software application to a customized mobile application may be integrated into the publishing flows of template mobile applications.

During the code modification and build process 903, the customization application tools 902 may be used to modify the mobile application code 901, before building (or rebuilding) the code into an executable customized mobile application. As noted above, the mobile application code 901 may correspond to an executable software component (e.g., a native mobile application, a template application, a binary SDK, etc.) or to unbuilt and not executable software code. Thus, if the mobile application code 901 is a executable application, the modification and build process 903 may include opening (or decomposing) the existing application bundle, modifying the application code 901 by embedding custom code and/or modifying the existing application code. In some cases, user-specific assets may be inserted into the code, such as user's certificates, user's initial set of policies, user's session token, etc.). Additionally, the template application code may be modified to change the application characteristics, for example, the application name, application icon, user interface components, application-specific policies, service registration, service URIs, and the like, to implement the desired characteristics of the custom application.

If the mobile application code 901 is unbuilt and not executable software code, for example, if the mobile application code 901 if under development by an ISV or organization associated with an enterprise system, then the custom code and/or application characteristics may be inserted into the code without needing to first open an executable application bundle. Additionally, in some template applications 901 (e.g., a generic or stub application, or a binary SDK corresponding to a generic or stub application), the code to implement various customized application features might already be included in the template.

During the modification and build process 903, the customization application tool(s) 902 may be configured to add certain functionality to the template application (e.g., custom binaries, modification of import address tables, insert of user assets, etc.), and to update certain characteristics of the template application (e.g., custom application name, friendly name, icon, user interface features, application-specific policies, service registration, etc.). For example, the customization software components 902 may receive a template application 901 from an application source (e.g., a template repository in an enterprise application store or MDM server 520), decompile the template application, change the application characteristics to customize the application, augment the application with a set of instructions that impose control based on a set of policies, and then recompile the application to form a customized application.

The code modification and building process 903 may be performed automatically by one or more software tools 902, or may include one or more steps involving user input and/or user interaction. In some examples, a software tool 902 may correspond to a command line utility or service that is capable of receiving template application code 901 (in the form of one or more binary executables and/or source code), opening the application bundle, modifying the application code 901, and building (i.e., bundling and signing) the executable customized mobile application, all without needing any user interaction or input. In other examples, user input and/or user interaction may be received and used during the process 903 of modifying the application code 901 and building the customized mobile application. For example, a command line utility 902 may allow users to specify arguments that control the customization of the template application, including the custom features and functionalities that will be inserted into the application code 901. For example, a user may specify an application name, icon, user interface features, and constraints and policies that will be implemented to control the custom application in an enterprise system (e.g., data encryption policies, secure communication policies, resource access constraints, etc.). The software tools 902 also may include a wizard 902 or other user interfaces to receive input from users (e.g., application developers or distributors, or enterprise system users converting template applications to custom application) specifying the custom features and functionalities to be applied to the template application. For instance, user input may be received and used to customize the functional features, look and feel, and publication information of applications generated based on template applications (e.g., web-based applications and client execution environment applications).

After the modifying the application code 901, the code may be compiled and built (or recompiled and rebuilt in the case of native mobile applications and the like) using one or more compilation and build software tools (e.g., the XCODE suite for developing iOS applications, or Visual Studio tools for developing Windows Phone or Windows mobile devices). The build process illustrated in FIG. 9 may include a testing/validation phase, in which some or all of the tests normally done during an application wrapping process may be performed. Such testing and validation may be performed on the software source code before the code is built (or rebuilt) into an executable application, and/or may be performed on the executable application after the compilation/build process. In some examples, additional testing and validation may be performed to ensure that the customized mobile application 904 is compatible with one or more enterprise systems. For instance, if a customized mobile application is intended to be offered and supported by an enterprise system, then a test utility may be used during or after the build process 903 to confirm that the custom application is compatible with the access gateway and/or infrastructure of the intended enterprise system.

As shown in FIG. 9, the process of modifying and building 903 the application code may produce a customized mobile application bundle 904. The application bundle 904 may include one or more executable binaries for the customized mobile application (e.g., .IPA files for APPLE mobile devices, .APK files for GOOGLE ANDROID mobile devices, .XAP or .APPX files for Windows Phone or Windows mobile devices, etc.), as well as one or more metadata files associated with the application (e.g., XML files, text files, or other metadata formats). As discussed above, customized mobile applications may be user-specific and/or device-specific applications that may be provided to mobile devices after enrollment. In some cases, the executable binaries for the customized mobile application 904 also may be provided to different application stores (e.g., enterprise application stores, public application stores, etc.). As discussed above, an enterprise application store (e.g., application store 378) may be populated with enterprise applications by an application controller 374, including secure and enterprise-specific applications.

Additionally, it should be understood that the various apparatuses of the computing environments shown herein may be computerized and communicate via electronic signals. For example, each computerized apparatus described in relation to FIG. 9 may include a communications interface to connect to a communications medium such as a computer network, memory to cache and/or persistently store information, and processing circuitry to execute an operating system and local applications, including some or all of the components discussed above in reference to FIGS. 1 and 2.

In certain embodiments, a user of mobile device may browse customized and/or non-customized applications offered by an application store server 540 via a client agent application 504 or a virtualization application 518, 519 (e.g., an application store application) installed on the mobile device 502. For example, when a user of a mobile device 502 wishes to acquire an application, the user may direct a client agent 504 on the mobile device 502 to request an appropriate application from the application store server 540. The application store server 540 may respond to the request by providing the application to the mobile device 502, and the mobile device user may then install the application. When the application is a customized mobile application, a customization process may be performed, such as the process described above in reference to FIG. 9, at the application store server 540, locally at the mobile device 502, and/or by other components within the enterprise mobility management system 500.

Referring now to FIG. 10, an example method is shown in which an application is modified and configured to create a customized application based on customization parameters determined by an enterprise administrator and/or by an enterprise user. In this example, two separate customization processes may be performed before an enterprise application is provided to an enterprise user; a first customization based on enterprise parameters defined by an administrator or policies of an enterprise system, and second customization determined by the characteristics of the specific users, specific devices, and/or specific enrollment sessions to which the application will be provided. In either and/or both of the customizations described in FIG. 10, software tools 902 may be used as described above to create a new customized mobile application by modifying and configuring a template mobile application.

In step 1001, an application template may be identified to be used for creating a customized application for an enterprise system. In some cases, an administrator of an enterprise system may identify an application template to be customized and made available to some or all users of the enterprise system. The template application may be, for example, a packaged web application, an application hosted in an enterprise data center (e.g., an application that is accessed using the HDX/ICA or other display remoting protocol), or an application that is used to access HDX/ICA or other virtual applications, such as for example virtualization applications 518, 519, or any other player application for rendering virtual applications, or any other type of general application for which an application template (e.g., generic or stub application) may be created.

In step 1002, a set of customization parameters may be selected to customize the application template for the enterprise system. The parameters may be selected in step 1002 by an enterprise administrator or based on enterprise policies to customize the template application for use by enterprise users. The customization parameters may include, for example, a custom application name, a friendly name, an application icon, one or more user interface component specifications, application-specific policies, service registrations, service URIs, and the like. Additionally, a template application may be customized by adding source code or executable code (e.g., custom binaries) and by modifying import address tables to support additional functionality. Thus, the customization parameters may identify locations of source code files or custom binaries, or the customization parameters may include address table data.

As discussed below, the set of customization parameters selected in step 1002 may be used to define a new enterprise application for the enterprise system's catalog, which may be provided to users via the enterprise application store 540 or may be automatically pushed to the mobile devices of certain users during the enrollment process or at other times by the enterprise system servers. Thus, the customization parameters selected in step 1002 may be, for example, parameters that customize an application's name, the look and feel of the application, or parameters that enable the application to connect to the enterprise servers or server-based applications of the enterprise system.

As discussed above in reference to FIG. 9, various software tools 902 may be used to receive input in steps 1001 and 1002 corresponding to the identification of a template application and customization parameters for creating a customized mobile application. Such tools may be automated (e.g., software components at the MDM server 520 configured to automatically create and provide custom applications to user devices 502), or interactive user-driver tools. Similarly, the identification of template applications and customization parameters in steps 1001 and 1002 may be provided from a number of different entities in different embodiments and scenarios. For example, companies may develop mobile business applications that are customized for individual employees or groups of employees. Such customized applications may be generated and provided automatically by the business, for example, in step 606, in response to the enrollment of a mobile device by a company employee. For example, an MDM server 520 may use device and/or user identifiers received in step 601 to determine the parameters of the customized applications. Additionally, as discussed below, employees in one line of business (e.g., engineering, accounting, human resources, etc.) may receive one set of customized applications in step 606, while employees in another line of business may receive another set of customized applications, etc. Thus, the set of customized applications provided to an employee's device upon enrollment also may depend on the employee's title, security clearance level, seniority within the company, and other factors. In still other examples, the parameters and preferences for creating customized applications may be provided in step 1002 by independent software vendors (ISVs) developing customized mobile applications for public consumers.

In step 1003, a first customization process may be performed based on the template application identified in step 1001 and the customization parameters selected in step 1002. The template application identified in step 1001 may be retrieved and be opened, for example, by decompiling or decomposing the application into readable and/or editable code, if necessary. After retrieving and opening a template application, the application may be modified based on the customization parameters selected in step 1002 (e.g., application name, user interface customization, etc.) and/or any additional custom functionality selected for the custom enterprise application.

In some cases, the retrieval and opening of the template application may be performed by software tools 902, discussed above. In such cases, a template application such as generic application or stub application may include application code designed for a specific type of application (e.g., web applications, hosted enterprise applications, etc.) that may be easily configured, built, and deployed as a separate customized mobile application. For example, an application template may be single purpose application (e.g., a single tab web browser application, a single session hosted enterprise application, etc.) with the underlying code to execute as a mobile application, and with a set of default configuration parameters that may be changed to modify the functionality of the application. For example, the configuration parameters of an application template may define the features and functionality of application, and may correspond to the customization parameters identified in step 1002 (e.g., constraints and policies that may be implemented to control the application in an enterprise system), the look and feel of the application user interface (e.g., application skin, text, supported features, etc.), and data for publication of the application (e.g., application name, friendly name, icon, etc.). Template applications may be designed and written so that such configuration parameters may be easily inserted and/or modified within the template by a software tool 902.

Thus, in step 1003, a template application may be provided as input to a software tool 902 used to create a managed application 904. In various examples, the software tools 902 may correspond to a software toolkit 902 provided to organizations, ISV's, or other software application developers. In such cases, one or more template applications may be provided along with the software toolkit 902, or may be downloadable from a separate location. In other examples, template applications might not be directly available to developers, but may be available indirectly via a software tool 902 such as a command-line tool, wizard, or other user interface software tool. For example, a user may interact with a software wizard 902 to select a template application and provide customization parameters, after which the software wizard 902 may retrieve and modify the underlying application template in accordance with the customization parameters provided by the user.

Certain types of template applications may be web application templates (or web browser template applications). In some cases, a web application template may be a browser application stub, or may be a web browser application factored out into a binary SDK. Web application templates may be based on a native web browser application supported by a mobile platform, such as an iOS web browser, WINDOWS PHONE web browser, or ANDROID web browser, and thus may include the traditional web browsing functionality. Web application templates also may include the code to be packaged as managed applications, so that the web browsing it supports may be performed using the security controls provided by an enterprise framework (e.g., network connectivity via micro VPN) to allow the web browser application to access Intranet resources as well as Internet resources.

In some examples, the customization in step 1003 of a web application template may include changing or removing typical web-browser navigation controls, address bar, menus, or other user interface features used by web browsers, so that the customized web application may have a specific look-and-feel different from a standard web browser. In different customizations of web application templates, different user interface components (e.g., menus, navigation controls, scroll bars, etc.) may be included or not included in the modified application code to provide different options for creating web applications. Additionally, the customization of a web application in step 1003 may include configuring various controls and security features of the internal application browser, for example, enabling or disabling scripting (e.g., Javascript) or applets (e.g., Java Applets), and enabling or disabling legacy browser behaviors and/or other browser features.

In other examples, a template application may be a hosted enterprise application template. A hosted enterprise application template may be based on a client execution environment application configured to provide a user interface for an application hosted in an enterprise data center. Hosted enterprise application templates may include, for example, the code from a client execution environment engine along with the user interface display controllers for the client execution environment session view. Applications generated from a hosted enterprise application template may be configured to access an enterprise data center using, for example, HDX/ICA display remoting protocols, and thus may be deployed through the gateway of an enterprise system (e.g., gateway 406), just like other native applications on the mobile device 402. In some examples, hosted enterprise application templates may be customized in step 1003 so that they operate only on a single session, rather than supporting multi-session applications, so that the customized hosted application generated from the template may have the look-and-feel of a single customized application.

As discussed above, a template application may include basic underlying functionality (e.g., web browsing, connection and hosting from an enterprise data center, etc.), but might not include the specific content or configuration of the customized application desired by enterprise administrators and/or enterprise users. Thus, the modification of the template application code in step 1003 may include customizing the functionality of the application (e.g., features, behaviors, etc.), customizing the appearance of the application (e.g., look-and-feel, providing a name and icon for publishing the application, etc.), and/or customizing how the application will be managed or controlled within the enterprise system (e.g., security features, constraints and policies, etc.).

For web application templates, the customization parameters received in step 1002 may include, for example, a name for the web application, an icon for publishing the web application, and a set of uniform resource locators (URLs) that define or limit the set of web pages or web resources for which the customized web application can be used. The set of URLs received to customize a web application may take the form of a URL list, or a set of base URL patterns input by the user via command-line arguments, a wizard, an input data file, or other user interface in step 1002. The customization parameters received for a web application template also may include parameters for security/management policy control, such as whether the web application will be permitted to tunnel back through the network, whether the web application will support copy and paste functionality internally and between other applications, and a list of the mobile device hardware and facilities (e.g., the GPS system, microphone, or other sensors on the mobile device) to which the web application will have access.

In examples of a hosted enterprise application template, the customization parameters received in step 1002 may include a name and icon for the application, a specific hosted enterprise application corresponding to the mobile application (e.g., when a customized single-session managed application is to be created), parameters corresponding to security/management policy controls for the hosted enterprise application, and parameters to configure the user interfaces of the hosted enterprise application.

The customized mobile application generated in step 1003 may be based on the modifications to the template application code. In some examples, step 1003 may be similar to the build process 903, discussed above. For instance, one or more executable binaries corresponding to the customized mobile application (e.g., .IPA files for APPLE mobile devices, .APK files for GOOGLE ANDROID, .XAP or .APPX files for Windows Phone or Windows mobile devices, etc.) may be generated in step 1003, using compilation and build software tools, such as the XCODE suite for developing iOS applications, or the Visual Studio tools for developing Windows Phone or Windows mobile devices, etc. In some cases, template applications may be designed so that customization parameters can be easily added into the template application, for example, as entries in a configuration data file, to allow the application to be easily rebuilt and recertified.

In step 1004, the enterprise application customized in step 1003 may be select by, or selected for, one or more enterprise users and/or mobile devices in the enterprise system. In some cases, a customized application may be published to an enterprise application store 540, from which users may browse and select the application to be downloaded to mobile devices 502. In other cases, enterprise administrators may determine which applications are distributed to various users and mobile devices. Enterprise policies also may be used to automatically push applications to users and/or devices. For example, an enterprise policy may be implemented to push a specific customized enterprise application to all devices during the enrollment process or any time after enrollment. Alternatively, some enterprise policies may push specific enterprise applications only to certain users and/or devices in the enterprise system, and not to other users and/or devices. For instance, a policy in an employer's enterprise system may be implemented to push a customized application to only a subset of its employees' mobile devices based on one or more employee criteria (e.g., the employee's title, work group or company division, physical office location, security clearance level, seniority at the company, etc.), or based on one or more device criteria (e.g., device input capabilities such as touch screen or voice recognition capabilities, device output capabilities such as screen size or graphics package, device memory and processing capabilities, device manufacturer and model, device operating system, etc.), or based on a combination of employee criteria and device criteria. In some examples, the enterprise system may be further configured to push a customized enterprise application to specific users and/or devices only during certain enrollment sessions. Thus, the set of enterprise applications and/or the specific customizations pushed to a mobile device 502 of a user during a first enrollment session may be different from the set of enterprise applications and customizations pushed to the same mobile device 502 of the same user during subsequent enrollment sessions.

In step 1005, after identifying one or more enterprise devices 502 to receive an enterprise application customized in step 1003, a second set of customization parameters may be determined to further customize the enterprise application for the specific user and/or specific device that will receive the application. The second set of customization parameters determined in step 1005 may also depend on the specific enrollment session of the user and device, so that different enrollment sessions of the same device by the same user may result in different sets of applications and/or customizations of applications. Similar to the customization parameters discussed above in step 1002, the customization parameters in step 1005 may include any combination of parameters to customize the functional behavior and/or the appearance of the application. For example, such parameters may include parameters to customize the look-and-feel of the application, such as a custom application name, a friendly name, an application icon, one or more user interface component specifications (e.g., window size and positioning, background color and themes, etc.), application-specific policies, service registrations, service URIs, and the like. The customization parameters also may include locations of source code files or custom binaries, address table data, or other parameters used to customize the functionality of the application.

In step 1006, a second customization of the enterprise application customized in step 1003 may be performed, based on the second set of customization parameters selected in step 1005. In some cases, the second customization process 1006 may be performed using the same or similar software tools and features as the first customization process 1003. The customized application may be retrieved and be opened, for example, by decompiling or decomposing the application into readable and/or editable code (if necessary) after which the application may be modified based on the second set of customization parameters selected in step 1005. Like the first customization 1003, the second customization 1006 may be performed at the enterprise store 540, at the client device 502, or by a combination of components within an enterprise mobility management system, and may be performed using the various software tools and processes described above in FIG. 9.

As discussed above in step 1003, the customization of a web application may include configuring the functional and user interface features of the web-browser controls, creating a customized look-and-feel for the enterprise application, as well as configuring controls and security features of the internal application browser. The second customization of web applications in step 1006, which may be user-specific, device-specific, and/or session-specific, may involve configuring some or all of the same features of the web applications. For example, after determining various server endpoints for a web application based on the user, device, and/or session, the second customization 1006 may include configuring the web application's controls and security features based on the determined server endpoints. For instance, scripting, applets, legacy browsing behaviors and other browsing features may be enabled or disabled based on server endpoints determined for the application (which may be user-, device-, or session-specific). Additionally, a web application may be customized in step 1006 to incorporate client certificates linked to the user enterprise profile of the user that will receive the application. Similar customizations may be performed in step 1006 for non-web applications, such as hosted enterprise applications, after the appropriate server URLs for the specific users, devices, and/or sessions are determined. For example, various HDX/ICA client options may be incorporated into the application bundle during the customization of step 1006, such as adding built-in authentication certificates into the application.

Thus, as illustrated in FIG. 10, two separate customization processes may be performed on an enterprise application provided to user devices in an enterprise system: a first customization of a template application based on a first set of enterprise-specific customization parameters, discussed above in steps 1001-1003; and a second customization of the custom enterprise application based on a second set of user-specific, device-specific, and/or enrollment session-specific customization parameters, discussed above in steps 1004-1006. In some examples, the first set of customizations may correspond to enterprise-wide customizations selected by an enterprise administrator or determined by enterprise policies. Such customizations may be applicable to an entire enterprise mobility management system and may be performed before making the application available to users. In contrast, the second set of customizations may correspond to user-specific, device-specific, and/or enrollment session-specific customizations that are applied after an application has been selected by (or selected for) an enterprise user and just before providing the application to the user's mobile device. In some systems, the first customization may include enterprise-wide customizations of an application that define the overall application appearance and look-and-feel chosen by the organization, along with the functional application features provided by the organization, whereas the second customization may include user-, device-, or session-specific customizations such as embedding the appropriate server URLs for the user into the application, enabling and disabling certain application features based on the user's functional requirements or level of permissions, or changing the display and input/output features of the application based on the capabilities of the device that will receive the application. In such examples, the sets of customization parameters may be entirely different for the first customization and the second customization. However, in other examples, the first and second set of customization parameters may overlap, such that the first customization may set and configure certain aspects of the application for general enterprise use, which then may be changed or overwritten during the second customization based on the specific user, device, or enrollment session during which the application will be received.

In step 1007, the enterprise application that was customized in step 1003, and customized again in step 1006, may be provided to the mobile devices of one or more enterprise users. As discussed above, the customized enterprise application may be published to an enterprise application store 540, where it may be selected by a user and then customized again for the user or device, after which it may be provided to the user's mobile device 502. In other cases, the customized application may be selected by an enterprise administrator or enterprise policy to be distributed to one or more specific users or devices (and/or during specific enrollment sessions), after which the customized application may be further customized for each selected user, device, and/or session and then automatically transmitted to the appropriate mobile devices 502 during or after the enrollment process. Similar techniques may be used for providing customized updates (e.g., enterprise-specific, user-specific, device-specific, and/or session-specific customizations) of existing enterprise applications residing the mobile devices within the enterprise mobility management system.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein.

The invention claimed is:

1. A method, comprising:
   receiving, by a computing device, an enrollment request from a mobile device to enroll in a mobile device management (MDM) system;
   generating, by the computing device, a session cookie after receipt of the enrollment request, the generation of the session cookie including use of a device identifier of the mobile device and an identifier of the MDM system, and the session cookie being unique to an enrollment session of the mobile device into the MDM system, so that the mobile device receives different session cookies in response to the mobile device requesting enrollment in the MDM system on different occasions;
   prior to providing a client agent to the mobile device:
      embedding the session cookie into a client agent application template, wherein the session cookie enables a client agent application to access the MDM system after enrollment and during a first-time use of the client agent;
      embedding enterprise uniform resource locators (URLs) into the client agent application template, wherein the enterprise URLs correspond to enterprise resources of the MDM system;
      embedding one or more policies into the client agent application template to configure the client agent application template, the one or more policies being based on at least one of the device identifier and an identity of a user of the mobile device; and
      building the client agent application comprising the session cookie, the enterprise URLs and the one or more policies;
   providing the client agent to the mobile device by transmitting the client agent application comprising the session cookie, the enterprise URLs and the one or more policies to the mobile device; and
   permitting, by the computing device, based on the session cookie, the client agent application to automatically access the MDM system with Single-Sign-On (SSO) during the first-time use of the client agent after the enrollment.

2. The method of claim 1, wherein transmitting the client agent application comprising the session cookie to the mobile device comprises transmitting the session cookie to the mobile device using an MDM protocol.

3. The method of claim 1, wherein embedding the enterprise URLs comprises:
   embedding the enterprise URLs into at least one of the client agent application or a managed line-of-business (LOB) application to be transmitted to the mobile device.

4. The method of claim 1, further comprising:
   in response to the enrollment request, embedding one or more first-time use policies into a managed line-of-business (LOB) application;

building the managed LOB application comprising the
   embedded first-time use policies; and
transmitting the managed LOB application comprising
   the embedded first-time use policies to the mobile
   device.
5. The method of claim 1, further comprising:
after providing the session cookie to the mobile device,
   receiving from the mobile device a communication
   containing the session cookie;
retrieving an expiration time associated with the session
   cookie; and
determining whether the session cookie is valid based on
   the expiration time.
6. The method of claim 1, further comprising:
Identifying the user associated with the enrollment
   request, and a device associated with the user, wherein
   the device has been previously enrolled in the MDM
   system and the device is different from the mobile
   device;
determining a set of customized application parameters
   based on the user and the device;
generating the client agent application using the set of
   customized application parameters and the client agent
   application template; and
transmitting the client agent application to the mobile
   device in response to the enrollment request.
7. The method of claim 6, wherein determining the set of customized application parameters and generating the client agent application comprises:
receiving a first set of customization parameters based on
   enterprise policies for the client agent application;
performing a first customization process on the client
   agent application template, using the first set of customization parameters, to create a first customized
   client agent application;
receiving a second set of customization parameters based
   on the user, the device, or the enrollment session; and
performing a second customization process on the first
   customized client agent application, using the second
   set of customization parameters, to create the client
   agent application.
8. An apparatus, comprising:
a processor; and
memory storing executable instructions that, when
   executed by the processor, cause the apparatus to:
   receive an enrollment request from a mobile device to
      enroll in a mobile device management (MDM) system;
   generate a session cookie after receipt of the enrollment
      request, the generation of the session cookie including use of a device identifier of the mobile device and
      an identifier of the MDM system, and the session
      cookie being unique to an enrollment session of the
      mobile device into the MDM system, so that the
      mobile device receives different session cookies in
      response to the mobile device requesting enrollment
      in the MDM system on different occasions;
   prior to providing a client agent to the mobile device:
      embed the session cookie into a client agent application template;
      embed enterprise uniform resource locators (URLs)
         into the client agent application template, wherein
         the enterprise URLs correspond to enterprise
         resources of the MDM system;
      embed one or more policies into the client agent
         application template to configure the client agent
         application template, the one or more policies
      being based on at least one of the device identifier
         and an identity of a user of the mobile device; and
      build a client agent application for the mobile device,
         the client agent application comprising the session
         cookie the enterprise URLs and the one or more
         policies;
   provide the client agent to the mobile device by transmitting the client agent application comprising the
      session cookie, the enterprise URLs and the one or
      more policies to the mobile device; and
   permit, based on the session cookie, the client agent
      application to automatically access the MDM system
      with Single-Sign-On (SSO) during a first-time use of
      the client agent after an enrollment.
9. The apparatus of claim 8, wherein transmitting the client agent application comprising the session cookie to the mobile device comprises transmitting the session cookie to the mobile device using an MDM protocol.
10. The apparatus of claim 8, the memory storing further executable instructions that, when executed by the processor, cause the apparatus to:
   embedding the enterprise URLs into at least one of the
      client agent application or a managed line-of-business
      (LOB) application to be transmitted to the mobile
      device.
11. The apparatus of claim 8, the memory storing further executable instructions that, when executed by the processor, cause the apparatus to:
   embed one or more first-time use policies into a managed
      line-of-business (LOB) application;
   build the managed LOB application comprising the
      embedded first-time use policies; and
   transmit the managed LOB application comprising the
      embedded first-time use policies to the mobile device.
12. The apparatus of claim 8, the memory storing further executable instructions that, when executed by the processor, cause the apparatus to:
   receive a communication containing the session cookie
      from the mobile device, after providing the session
      cookie to the mobile device;
   retrieve an expiration time associated with the session
      cookie; and
   determine whether the session cookie is valid based on the
      expiration time.
13. The apparatus of claim 8, the memory storing further executable instructions that, when executed by the processor, cause the apparatus to:
   identify at least one of the user, a device, or the enrollment
      session associated with the enrollment request;
   determine a set of customized application parameters
      based on the user, the device, or the enrollment session;
   generate the client agent application using the set of
      customized application parameters and an application
      template; and
   transmit the client agent application to the mobile device
      in response to the enrollment request.
14. A system, comprising:
a mobile device management (MDM) system server; and
one or more mobile devices,
wherein each of said mobile devices comprises a processor and memory storing executable instructions that,
   when executed by the processor, cause the mobile
   device to:
   transmit an enrollment request to the MDM system
      server, said enrollment request comprising a device
      identifier of the mobile device;

receive a session cookie from the MDM system server in response to the enrollment request; and use the session cookie to establish communication with the MDM system, wherein the MDM system server comprises a processor and memory storing executable instructions that, when executed by the processor, cause the MDM system server to:

receive enrollment requests from the one or more mobile devices, each said enrollment request comprising a device identifier of a corresponding mobile device, and for each received enrollment request, identify at least one of a user, a device, or an enrollment session associated with the enrollment request;

determine a set of customized application parameters based on the user, the device, or the enrollment session;

generate session cookies after receipt of the enrollment request, the generation of the session cookie including use of the device identifier of the mobile device and an identifier of the MDM system, and the session cookie being uniquely generated for a single enrollment session of a single mobile device, so that the mobile device receives different session cookies in response to the mobile device requesting enrollment in the MDM system on different occasions;

prior to providing a client agent to the one or more mobile devices, generate a customized application for each mobile device using a corresponding session cookie, a plurality of enterprise URLs, one or more policies, the set of customized application parameters and an application template, wherein the plurality of enterprise URLs correspond to enterprise resources of the MDM system, the one or more policies being based on at least one of the device identifier and an identity of the user of the mobile device;

provide the client agent to the mobile device;

transmit the customized application comprising the corresponding session cookie, the enterprise URLs, the one or more policies, the set of customized application parameters and application template to each mobile device in response to the enrollment request; and permit, based on the session cookie, and after the transmitting, the client agent to automatically access the MDM system with Single-Sign-On (SSO) during a first-time use of the client agent after an enrollment.

15. The method of claim 1, wherein the permitting further comprises:

permitting the client agent application to automatically access the enterprise resources of the MDM system with the Single-Sign-On (SSO) during the first-time use of the client agent.

16. The apparatus of claim 8, the memory storing further executable instructions that, when executed by the processor, cause the apparatus to:

permit the client agent application to automatically access the enterprise resources of the MDM system with the Single-Sign-On (SSO) during the first-time use of the client agent.

* * * * *